United States Patent [19]

Keown et al.

[11] 4,156,671

[45] May 29, 1979

[54] PROCESS FOR THE PREPARATION OF CHLOROPRENE POLYMER SOLUTIONS SUITABLE FOR CONTACT ADHESIVES

[75] Inventors: Robert W. Keown, Wilmington, Del.; John W. McDonald, West Chester, Pa.; Jurgen K. Weise, Wilmington, Del.

[73] Assignee: E. I. Du Pont de Nemours and Company, Wilmington, Del.

[21] Appl. No.: 744,415

[22] Filed: Nov. 23, 1976

[51] Int. Cl.$^2$ .................. C08F 114/00; C08J 3/04; C08J 3/00; C08F 8/06
[52] U.S. Cl. .................. 260/32.8 R; 260/33.4 R; 260/33.6 UA; 260/33.8 UA; 526/17; 526/51; 526/57; 526/58; 526/914; 156/333
[58] Field of Search .................. 260/32.8 R, 33.6 UA, 260/33.8 UA, 33.4 R; 526/17, 57, 58, 51; 156/333

[56] References Cited

U.S. PATENT DOCUMENTS

| | | | |
|---|---|---|---|
| 2,770,603 | 11/1956 | Lynch | 260/29.7 |
| 3,049,523 | 8/1962 | Roussel | 526/17 |
| 3,062,802 | 11/1962 | Cunneen et al. | 260/79.3 R |
| 3,654,940 | 4/1972 | Ritzl | 134/2 |
| 3,790,549 | 2/1974 | Feniak | 526/20 |
| 3,957,737 | 5/1976 | Pautrat et al. | 260/79.3 R |
| 4,074,033 | 2/1978 | Wolinski et al. | 526/57 |

FOREIGN PATENT DOCUMENTS

| | | | |
|---|---|---|---|
| 871320 | 6/1961 | United Kingdom | 526/58 |
| 894701 | 4/1962 | United Kingdom | 526/17 |
| 1052581 | 12/1966 | United Kingdom | 526/57 |

*Primary Examiner*—Herbert J. Lilling

[57] ABSTRACT

Production of a solution of a chloroprene polymer, suitable for use as a component for an adhesive, by dissolving the polymer in a solvent, and heating the solution, adding a free-radical catalyst and contacting the solution with a molecular oxygen containing gas, until the viscosity of the solution is lowered by at least about 10%.

10 Claims, No Drawings

PROCESS FOR THE PREPARATION OF CHLOROPRENE POLYMER SOLUTIONS SUITABLE FOR CONTACT ADHESIVES

This invention relates to a process for the production of a solution of a chloroprene polymer in an organic solvent suitable for use as a major component in what are known as "rubber cement" (solvent based) adhesives.

It has been conventional commercial practice to prepare organic solutions of chloroprene polymers by milling the polymer prior to dissolving it in the solvent. The milling reduces the average molecular weight of the polymer and narrows the molecular weight distribution. A typical method of measuring this change in molecular weight is by observing the reduction in solution viscosity. A solvent adhesive prepared from a milled chloroprene polymer has properties that are more satisfactory in many respects; for example, the adhesive has better storage stability and application characteristics than solvent adhesives prepared from unmilled chloroprene polymers.

The present invention provides a process for the production of an organic solution of a chloroprene polymer in which the polymer is not milled to affect its properties, and yet the solution can be employed in a solvent adhesive and the adhesive will have properties substantially as good as or better than the properties of an adhesive prepared from a milled chloroprene polymer.

The process of the present invention comprises preparing a solution of about 10 to about 30 weight percent of a chloroprene polymer in a compatible organic solvent, heating the solution to a temperature in the range of about 40° C. to 100° C., preferably about 50° to 80° C., contacting the solution with a molecular oxygen containing gas, adding to the solution maintained at about 40° C. to 100° C. a free-radical catalyst. The catalyst should have a half-life of 5 to 15 hours at a temperature of about 40° to 100° C. The reaction time is usually about 15 minutes to about 4 hours.

After the reaction has proceeded to the desired extent, usually at least about a 10% reduction in viscosity, up to about a 90% reduction in viscosity, the reaction may be terminated by adding the solution to a mixture of the other ingredients to be used in the adhesive. The following additional ingredients are commonly employed in solvent adhesives based on chloroprene polymers: phenolic resins, antioxidants (generally phenolic antioxidants), zinc oxide, magnesium oxide, small amounts (about 1 part per hundred parts of the chloroprene polymer) of water, and additional organic solvents.

Chloroprene polymers that may be used in the present invention include chloroprene homopolymers, copolymers of chloroprene and other unsaturated vinyl monomers in which the chloroprene component is at least 80% by weight of the copolymer, as well as copolymers of chloroprene with sulfur and terpolymers with an unsaturated vinyl monomer and with sulfur, these last two types of copolymers being known as sulfur-modified chloroprene polymers.

Vinyl comonomers which can be copolymerized with chloroprene include, among others, styrene, vinyltoluene, vinylnaphthalenes, 1,3-butadiene, isoprene, 2,3-dimethyl-1,3-butadiene, 2,3-dichloro-1,3-butadiene, methyl vinyl ether, methyl vinyl ketone, vinyl acetate, ethyl acrylate, methyl methacrylate, methacrylamide, methacrylic acid and acrylonitrile.

Many chloroprene polymers are commercially available; all can be made according to processes well known in the art, usually in an aqueous emulsion, at a pH of about 10–13. The monomer concentration normally is about 40–60% of the total weight of the emulsion. The polymerization conditions may be based on one or more of the following U.S. Pat. Nos. 2,831,842 (Aho); 2,576,009 (Goertz); 2,567,117 (Mochel); 2,467,769 (Morrow et al.); 3,147,317 (Jungk et al); 2,494,087 (Daniels); and 3,686,156 (Hagman). Suitable chloroprene polymers include those which are substantially or predominately sol polymers as well as sol-gel blends (for example, such as described in U.S. Pat. No. 3,655,827 to Finlay et al.) Sulfur-modified chloroprene polymers are conveniently made according to the methods described in U.S. Pat. Nos. 3,310,544 (Aho); 2,264,173 (Collins); 3,766,121 (Fichteman); and 3,397,173 (Collette et al.).

Suitable solvents for dissolving the chloroprene polymers are well known in the art and include (1) chlorinated hydrocarbons such as methylene chloride, chloroform, and trichloroethylene, (2) aromatic hydrocarbons such as benzene, toluene, and xylene, (3) ketones such as acetone, methyl ethyl ketone, diisobutyl ketone, (4) esters such as ethyl acetate, butyl acetate, amyl acetate, (5) lower alcohols such as methanol and ethanol, (6) aliphatic hydrocarbons such as heptane, hexane, and cyclohexene, and (7) mixtures of the above solvents.

The free-radical catalysts may include alkyl and aromatic peroxides and hydroperoxides, azo compounds, and ketone and acid peroxides. The free-radical catalyst should have a half-life at the reaction temperature (40° to 100° C.) of about 5 to 15 hours. About 0.03 to 3 parts by weight catalyst per 100 parts of the chloroprene polymer are satisfactory, usually about 0.1 to 0.5 parts are employed. Suitable catalysts include:

azobisdimethylvaleronitrile
azobisisobutyronitrile
benzoyl peroxide
acetyl peroxide
lauroyl peroxide
caprylyl peroxide
succinic acid peroxide
cyclohexanone peroxide
2,2'-azobis(2,4-dimethyl-4-methoxyvaleronitrile).

The process requires that a gas containing molecular oxygen be in contact with the solution. Air is a satisfactory and preferred material, but other gases such as nitrogen containing molecular oxygen could also be employed. The oxygen-containing gas can be added to the polymer solution by means of a dip tube which extends below the surface of the solution, or the oxygen-containing gas can merely be allowed to contact the surface of the solution. Better dispersion of the gas may be obtained by feeding the gas through a fritted glass disk attached to the dip tube. When air is employed as the oxygen-containing gas, it may be introduced at a rate of about 10 to 400 cubic centimeters (cc)/minute/1000 cc of solution. This rate corresponds to 2–80 cc oxygen/minute/1000 cc of solution. The amount of oxygen absorbed by the solution when the molecular oxygen containing gas is air is in the range of about 0.5 to 7 volume percent.

In the following examples which illustrate this invention all parts and percentages are by weight unless otherwise stated.

EXAMPLES

Examples 1-7

General Procedure

An approximately 17 wt. % solution of the chloroprene polymer in a solvent is prepared by dissolving about 400 gm polymer in about 2000 gm solvent in a five liter three-neck flask equipped with a stirrer and a water cooled condenser open to the atmosphere. The solution is heated with stirring. The free-radical catalyst is added in small increments over a period of about one minute. At selected times 611 gm aliquots of the solution are removed and the reaction is terminated by the addition of the aliquot to a prereaction masterbatch of adhesive compounding ingredients. The masterbatch is prepared by mixing 8 phr (parts per hundred chloroprene polymer) magnesium oxide, 5 phr zinc oxide, 1 phr water, 40 phr t-butyl phenolic resin (sold as CMK-1634 by Union Carbide), 2 phr fortified hindered phenol (solid as "Zalba" Special Rubber Antioxidant by E. I. du Pont de Nemours and Company), 100 phr toluene and 10 phr isopropanol. The viscosities of the adhesives are measured at room temperature with a Brookfield Viscometer (procedure described in E. I. du Pont de Nemours and Company bulletin "Brookfield Viscometer Method V-490.05 005" based on ASTM Method D-1638-59T). The percent adhesive viscosity reduction is calculated from the comparison with the viscosity of the same adhesive formulation using the corresponding untreated chloroprene polymer.

The results of the individual experiments are shown in Table I.

In Table I the following abbreviations are used:

Polymer A: polychloroprene of Mooney viscosity (ML$_2$ $_{1/2}$-100° C.) 105 sold as Neoprene AD-30 by E. I. du Pont de Nemours and Company.

Polymer B: polychloroprene of Mooney viscosity (ML$_2$ $_{1/2}$-100° C.) 120 sold as Neoprene WHV-A by E. I. du Pont de Nemours and Company.

Polymer C: chloroprene (99.5 wt. %)/methacrylic acid (0.5) copolymer of Mooney viscosity (ML$_2$ $_{1/2}$-100° C.) 50.

Polymer D: chloroprene/sulfur copolymer of Mooney viscosity (ML$_2$ $_{1/2}$-100° C.) 50 sold as Neoprene GN-M2 by E. I. du Pont de Nemours and Company.

Solvent Mixture: 1 (part volume) toluene, 1 (part volume) methyl ethyl ketone, 1 (part volume) n-heptane.

BPO: benzoyl peroxide.

ABVN: azobisdimethylvaleronitrile.

TABLE I

| Example | Polymer | Solvent | Free Radical Catalyst | Temp. | Viscosity Reduction After (Time) |
|---|---|---|---|---|---|
| (Control)[a] | B | Mixture | 0.3 phr ABVN | 52° C. | 2% (30 min.) 3 (75 min.) 3 (3 hr.) |
| 1 | A | Mixture | 1.3 BPO | 70 | 88 (1 hr.) 91 (2 hr.) 92 (4 hr.) |
| 2 | B | Mixture | 0.1 BPO | 70 | 23 (15 min.) 30 (30 min.) 37 (45 min.) 42 (75 min.) |
| 3 | B | Mixture | 0.5 BPO | 70 | 72 (30 min.) |
| 4 | B | 1,1,1-Trichloroethane | 0.3 BPO | 70 | 46 (15 min.) 85 (3 hr.) |
| 5 | B | Mixture | 0.3 ABVN | 52 | 14 (30 min.) 14 (75 min.) 36 (3 hr.) |
| 6 | C | 1,1,1-Trichloroethane | 0.3 BPO | 70 | 53 (30 min.) 62 (75 min.) 74 (3 hr.) |
| 7[b] | D | Toluene | 1 BPO | 50 | 29 (2 hr.) 50 (24 hr.) |

[a]Reaction carried out under a nitrogen atmosphere.
[b]The reaction solution contained 25 wt. % polymer.

Example 8

The general procedure of the previous examples was used to prepare two adhesives from solutions of polymer A that had been treated for 1 and 2 hours (70° C., 1.3 phr benzoyl peroxide). Canvas to canvas bonds were prepared from the adhesives, and the bonds aged 5 days at room temperature. Creep adhesion of the bonds was measured after various periods of time at 80° C. under a 2.26 kg. load by ASTM Methods D-186 and D-413-39. The results are summarized in Table II.

TABLE II

| CREEP ADHESION - CENTIMETERS SEPARATION | | | | |
|---|---|---|---|---|
| | Untreated Control | Milled Control | This example | |
| | | | 1 Hr. | 2 Hrs. |
| Adhesive Viscosity | 1525 cps | 325 | 175 | 140 |
| Creep After: | | | | |
| 15 min. | 4.3 cm | fail | 3.3 | 2.8 |
| + | 7.1 | (>12.7) | 5.8 | 5.3 |
| 45 | 7.4 | | 7.6 | 7.6 |
| 60 | 7.4 | | 8.6 | 8.6 |
| 120 | 7.9 | | 11.2 | 8.9 |

I claim:

1. A process for the production of a solution of a chloroprene polymer suitable for use as the major constituent in an adhesive which comprises preparing a solution of about 10 to 30 weight percent of a chloroprene polymer in a compatible organic solvent, heating the solution to a temperature in the range of about 40° to 100° C., contacting the solution with a molecular oxygen containing gas, adding a free-radical catalyst to the solution while it is maintained at a temperature of about 40° C. to 100° C., said catalyst having a half-life of 5 to 15 hours at the conditions under which the process is being conducted.

2. The process of claim 1 in which the chloroprene polymer is selected from the class consisting of homopolymers of chloroprene and copolymers of chloroprene in which chloroprene is at least 80 weight percent of the total weight of the polymer.

3. The process of claim 2 in which the compatible organic solvent is selected from the group consisting of chlorinated hydrocarbons, aromatic hydrocarbons, ketones, esters, lower alcohols, aliphatic hydrocarbons and mixtures of these compounds.

4. The process of claim 3 in which the free-radical catalyst is selected from the class consisting of alkyl and aromatic peroxides, alkyl and aromatic hydroperoxides, azo compounds, and ketone and acid peroxides.

5. The process of claim 4 in which the molecular oxygen containing gas is air.

6. The process of claim 5 in which the solution is heated to a temperature between about 50° and 80° C.

7. The process of claim 5 in which air is fed into the solution at the rate of about 10 to 400 cubic centimeters/minute/1000 cubic centimeters of solution.

8. The process of claim 7 in which the amount of free-radical catalyst added to the solution is 0.03 to 3 parts by weight per 100 parts by weight of the polymer of chloroprene, and in which the catalyst is added in small increments.

9. The process of claim 8 in which the organic solvent is a mixture of 1 volume part toluene, 1 volume part methyl ethyl ketone and 1 volume part of normal heptane.

10. The process of claim 9 in which the free-radical producing initiator is benzoyl peroxide.

* * * * *